(12) United States Patent
Qian et al.

(10) Patent No.: US 9,950,483 B2
(45) Date of Patent: Apr. 24, 2018

(54) METHOD FOR DETERMINING THE SURFACE CONCENTRATION OF CARBOXYL GROUPS ON A LENS

(71) Applicant: Novartis AG, Basel (CH)

(72) Inventors: Xinming Qian, Johns Creek, GA (US); Frank Chang, Cumming, GA (US); Troy Vernon Holland, Suwanee, GA (US); Yongxing Qiu, Duluth, GA (US); Venkat Shankar, Alpharetta, GA (US)

(73) Assignee: Novartis AG, Basel (CH)

( * ) Notice: Subject to any disclaimer, the term of this patent is extended or adjusted under 35 U.S.C. 154(b) by 730 days.

(21) Appl. No.: 14/289,046

(22) Filed: May 28, 2014

(65) Prior Publication Data

US 2014/0356965 A1 Dec. 4, 2014

Related U.S. Application Data

(60) Provisional application No. 61/828,494, filed on May 29, 2013.

(51) Int. Cl.
*G02B 1/04* (2006.01)
*C23C 14/54* (2006.01)
(Continued)

(52) U.S. Cl.
CPC .. *B29D 11/00865* (2013.01); *B29D 11/00951* (2013.01); *G02B 1/043* (2013.01)

(58) Field of Classification Search
CPC ............ G02B 1/04; C23C 14/54; B29D 11/00
(Continued)

(56) References Cited

U.S. PATENT DOCUMENTS

| 3,408,429 A | 10/1968 | Wichterle |
| 4,347,198 A | 8/1982 | Ohkada |

(Continued)

FOREIGN PATENT DOCUMENTS

EP 1465931 B1 8/2007

OTHER PUBLICATIONS

Ivanov et al. Determination of Functional Groups on Polymer Surfaces Using Fluorescence Labelling. Surface and Interface Analysis. vol. 24, 257-262 (1996).*
(Continued)

*Primary Examiner* — Cachet I Sellman
(74) *Attorney, Agent, or Firm* — Jian Zhou

(57) ABSTRACT

The invention is related to a method for qualifying and quantifying carboxyl groups on the surfaces of a silicone hydrogel contact lens. The method of the invention comprises the steps of: (a) obtaining silicone hydrogel contact lenses each of which comprises a silicone hydrogel lens body (i.e., bulk material) and a coating thereon, wherein the silicone hydrogel lens body is obtained from a lens formulation free of any polymerizable component including one or more carboxyl groups, wherein the coating comprises a polymer having carboxyl groups; (b) immersing a given number of the silicone hydrogel contact lenses in a fixed volume of a $C_1$-$C_4$ alcohol solution of a positively-charged dye having acetate as counter anion at a given initial concentration for a time period sufficient to stain the silicone hydrogel contact lens; and (c) determining the concentration of carboxyl groups per each silicone hydrogel contact lens and/or the thickness of the coating on the silicone hydrogel contact lens.

17 Claims, 1 Drawing Sheet

(51) Int. Cl.
*C23C 16/52* (2006.01)
*B29D 11/00* (2006.01)

(58) Field of Classification Search
USPC .............................................. 427/8–10, 2.28
See application file for complete search history.

(56) References Cited

U.S. PATENT DOCUMENTS

| | | | |
|---|---|---|---|
| 4,444,711 A | | 4/1984 | Schad |
| 4,460,534 A | | 7/1984 | Boehm |
| 5,168,066 A | * | 12/1992 | Zahniser ................ G01N 1/30 356/36 |
| 5,408,280 A | * | 4/1995 | von der Haegen .... G02B 1/043 351/159.33 |
| 5,508,317 A | | 4/1996 | Müller |
| 5,583,463 A | | 12/1996 | Merritt |
| 5,789,464 A | | 8/1998 | Müller |
| 5,843,346 A | | 12/1998 | Morrill |
| 5,849,810 A | | 12/1998 | Müller |
| 5,894,002 A | | 4/1999 | Boneberger |
| 6,451,871 B1 | | 9/2002 | Winterton |
| 6,719,929 B2 | | 4/2004 | Winterton |
| 6,793,973 B2 | | 9/2004 | Winterton |
| 6,800,225 B1 | | 10/2004 | Hagmann |
| 6,884,457 B2 | | 4/2005 | Gilliard |
| 6,896,926 B2 | | 5/2005 | Qiu |
| 6,926,965 B2 | | 8/2005 | Qiu |
| 6,940,580 B2 | | 9/2005 | Winterton |
| 7,297,725 B2 | | 11/2007 | Winterton |
| 7,384,590 B2 | | 6/2008 | Kelly |
| 7,387,759 B2 | | 6/2008 | Kelly |
| 2007/0229758 A1 | | 10/2007 | Matsuzawa |
| 2008/0152800 A1 | | 6/2008 | Bothe |
| 2008/0174035 A1 | | 7/2008 | Winterton |
| 2008/0226922 A1 | | 9/2008 | Ferreiro |
| 2009/0186229 A1 | | 7/2009 | Müller |
| 2012/0026458 A1 | * | 2/2012 | Qiu ........................ G02B 1/043 351/159.33 |

OTHER PUBLICATIONS

Authors: Sonja Visentin, Nadia Barbero, Simone Musso, Valentina Mussi, Chiara Biale, Rebecca Ploeger and Guido Viscardi Title: A sensitive and practical fluorimetric test for CNT acidic site determination Published: The Royal Society of Chemistry, (2010), vol. 46, pp. 1443-1445.

Authors: P. Natarajan and C. Raja Title: Studies on the dynamics of poly(carboxylic acids) with covalently bound thionine and phenosafranine in dilute aqueous solutions Published: European Polymer Journal, (2005), vol. 41, pp. 2496-2504.

Authors: Kahp Y. Suh, Jen Ming Yang, Ali Khademhosseini, David Berry, Thanh-Nga T. Tran, Hyongshin Park, Robert Langer Title: Characterization of Chemisorbed Hyaluronic Acid Directly Immobilized on Solid Substrates Published: Journal of Biomedical Materials Research Part B: Applied Biomaterials, (2005) vol. 72B, Issue 2, pp. 292-298.

Authors: Alberto Tiraferri, Menachem Elimelech Title: Direct quantification of negatively charged functional groups on membrane surfaces Published: Journal of Membrane Science (2012) vol. 389, pp. 499-508.

Authors: Bhuvanesh Gupta, Jons G. Hilborn, Isabelle Bisson, Peter Frey Title: Plasma-Induced Graft Polymerization of Acrylic Acid onto Poly (ethylene terephthalate) Films Published: Journal Applied Polymer Science (2001) vol. 81, pp. 2993-3001.

Authors: Larry E. Stevens and Jill I. Eckardt Title: Spectrophotometric Determination of Polyquaternium-1 with Trypan Blue by a Difference Procedure Published: Analyst (1987) vol. 112, pp. 1619-1621.

Authors: V.B. Ivanov, J. Behnisch, A. Holländer, F. Mehdorn and H. Zimmermann Title: Determination of Functional Groups on Polymer Surfaces Using Fluorescence Labelling Published: Surface and Interface Analysis (1996) vol. 24, pp. 257-262.

Authors: N. Médard, M. Aouinti, F. Poncin-Epaillard and P. Bertrand Title: ToF-SIMS ability to quantify surface chemical groups: correlation with XPS analysis and spectrochemical titration Published: Surface and Interface Analysis (2001) vol. 31, pp. 1042-1047.

Author: Andreas Holländer Title: Labelling techniques for the chemical analysis of polymer surfaces Published: Surface and Interface Analysis (2004) vol. 36, pp. 1023-1026.

Authors: Eric A. McArthur, Tao Ye, Jason P. Cross, Stéphane Petoud, and Eric Borguet Title: Fluorescence Detection of Surface-Bound Intermediates Produced from UV Photoreactivity of Alkylsiloxane SAMs Published: Journal American Chemical Society, (2004) vol. 126, pp. 2260-2261.

Authors: Rohit P. Popat, Ian Sutherland and En-Shang Sheng Title: Vapour-phase Chemical Derivatisation for the Determination of Surface Functional Groups by X-Ray Photoelectron Spectroscopy Published: Journal Material Chemistry (1995) vol. 5, pp. 713-717.

Authors: Yangjun Xing, Nikolay Dementev, Eric Borguet Title: Chemical labeling for quantitative characterization of surface chemistry Published: Current Opinion in Solid State and Materials Science (2007) vol. 11, pp. 86-91.

Authors: R. Tzoneva, B. Seifert, W. Albrecht, K. Richau, T. Groth and A. Lendlein Title: Hemocompatibility of poly(either imide) membranes functionalized with carboxylic groups Published: Journal Material Science: Mater Med (2008) vol. 19, pp. 3203-3210.

Authors: Hee Seok Yang, Kwideok Park, Jun Sik Son, Jae-Jin Kim and Dong Keun Han Title: Surface Modification and Fibrovascular Ingrowth of Porous Polyethylene Anophthalmic Implants Published: Macromolecular Research (2007) vol. 15, No. 3, pp. 256-262.

* cited by examiner

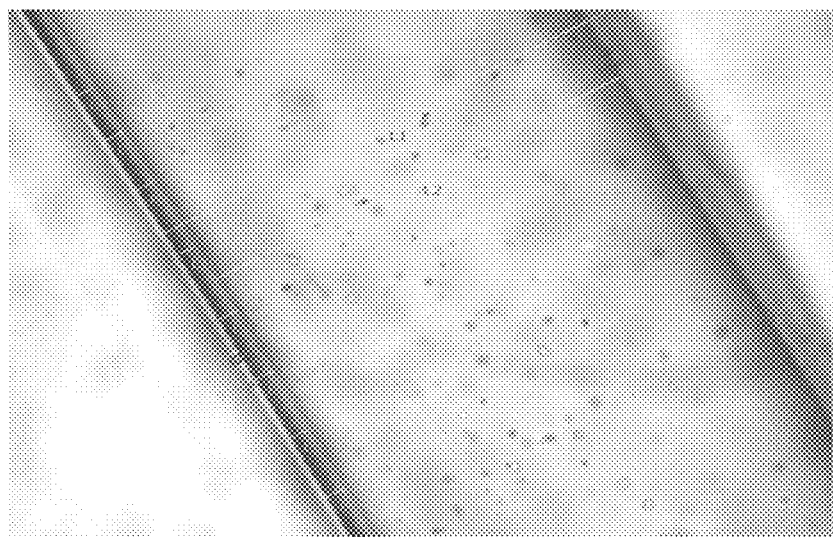

METHOD FOR DETERMINING THE SURFACE CONCENTRATION OF CARBOXYL GROUPS ON A LENS

This application claims the benefit under 35 U.S.C. § 119 (e) of U.S. provisional application Ser. No. 61/828,494 filed May 29, 2013, herein incorporated by reference in its entirety.

The present invention generally relates to a method for qualifying and quantifying carboxyl groups on the surfaces of contact lenses, in particular, silicone hydrogel contact lenses. In addition, the present invention provides a method for selecting a candidate polymer comprising carboxyl groups as a coating material for silicone hydrogel contact lenses and for optimizing a coating process for producing silicone hydrogel contact lenses with a coating thereon.

BACKGROUND

Soft silicone hydrogel contact lenses are increasingly becoming popular because of their high oxygen permeability and comfort. But, a silicone hydrogel material typically has a surface, or at least some areas of its surface, which is hydrophobic (non-wettable) and susceptible to adsorbing lipids or proteins from the ocular environment and may adhere to the eye. Thus, a silicone hydrogel contact lens will generally require a surface modification.

One of approaches for modifying the hydrophilicity of a relatively hydrophobic contact lens material is to apply at least one layer of a hydrophilic polymer comprising carboxyl groups to form layer-by-layer (LbL) coating onto silicone hydrogel contact lenses (see for example, U.S. Pat. No. 6,451,871, U.S. Pat. No. 6,719,929, U.S. Pat. No. 6,793,973, U.S. Pat. No. 6,884,457, U.S. Pat. No. 6,896,926, U.S. Pat. No. 6,926,965, U.S. Pat. No. 6,940,580, and U.S. Pat. No. 7,297,725, and U.S. Patent Application Publication Nos. US 2007/0229758A1, US 2008/0174035A1, and US 2008/0152800A1). Such an approach can be easily carried by a simple deposition technical, e.g., by simply contacting silicone hydrogel contact lenses with a solution of a hydrophilic polymer comprising carboxyl groups. Although such deposition technique can provide a cost effective process for rendering a silicone hydrogel material wettable, resultant LbL coatings may not be as durable and may have relatively high densities of negatively surface charges (e.g., carboxyl groups). To improve the durability, crosslinking of LbL coatings on contact lenses has been proposed in commonly-owned copending US patent application publication Nos. 2008/0226922 A1 and 2009/0186229 A1 (incorporated by reference in their entireties). However, crosslinked LbL coatings may still have relative high densities of surface charges (e.g., carboxyl groups). As discussed in US20120026458A1, contact lenses with a high surface concentration of negatively charged groups (e.g., carboxyl groups) are susceptible to high debris adhesion during patient handling, high protein adhesion during wearing (a majority of proteins in tears is believed to be positively charged), high deposition and accumulation of antimicrobials such polyhexamethylene biguanide (PHMB) present in contact lens care solutions. It would be desirable to have a low surface concentration of negatively charged groups (e.g., carboxyl groups) for silicone hydrogel contact lenses.

Therefore, there is still a need for a method for qualifying and quantifying carboxyl groups on lens surface and thereby for selecting a candidate polymer comprising carboxyl groups as a coating material for silicone hydrogel contact lenses as well as for optimizing a coating process for producing silicone hydrogel contact lenses with a coating thereon.

SUMMARY OF THE INVENTION

The invention, in one aspect, provides a method for qualifying and quantifying carboxyl groups on the surfaces of a silicone hydrogel contact lens, comprising the steps of: (a) obtaining silicone hydrogel contact lenses each of which comprises a silicone hydrogel lens body (i.e., bulk material) and a coating thereon, wherein the silicone hydrogel lens body is obtained from a lens formulation free of any polymerizable component including one or more carboxyl groups, wherein the coating comprises a polymer having carboxyl groups; (b) immersing a given number of the silicone hydrogel contact lenses in a fixed volume of a $C_1$-$C_4$ alcohol solution of a positively-charged dye having acetate as counter anion at a given initial concentration for a time period sufficient to stain the silicone hydrogel contact lens; and (c) determining the concentration of carboxyl groups per each silicone hydrogel contact lens.

In another aspect, the invention provides a method for selecting a candidate polymer comprising carboxyl groups as a coating material for silicone hydrogel contact lenses, comprising the steps of: (a) obtaining uncoated silicone hydrogel contact lenses each of which comprises a silicone hydrogel lens body (i.e., bulk material) obtained from a lens formulation free of any polymerizable component including one or more carboxyl groups; (b) obtaining candidate polymers each having carboxyl groups; (c) applying a coating of each candidate polymer onto each silicone hydrogel contact lenses to obtain coated silicone hydrogel contact lenses under identical coating conditions; (d) immersing a given number of the coated silicone hydrogel contact lenses in a fixed volume of a $C_1$-$C_4$ alcohol solution of a positively-charged dye having acetate as counter anion at a given initial concentration for a time period sufficient to stain the silicone hydrogel contact lens; (e) determining the surface concentration of carboxyl groups per each silicone hydrogel contact lens and/or the thickness of the coating on each coated silicone hydrogel contact lens for each candidate polymers; (f) selecting one candidate polymer that provides coated silicone hydrogel contact lens having a surface concentration of carboxyl lower than a predetermined criteria and/or a desired coating thickness.

In a further aspect, the invention provides a method for optimizing a coating process for producing silicone hydrogel contact lenses with a coating thereon, comprising the steps of: (a) obtaining uncoated silicone hydrogel contact lenses each of which comprises a silicone hydrogel lens body (i.e., bulk material) obtained from a lens formulation free of any polymerizable component including one or more carboxyl groups; (b) obtaining a polymer having carboxyl groups; (c) applying a coating of the polymer onto each silicone hydrogel contact lenses to obtain coated silicone hydrogel contact lenses under first coating conditions; (d) immersing a given number of the coated silicone hydrogel contact lenses in a fixed volume of a $C_1$-$C_4$ alcohol solution of a positively-charged dye having acetate as counter anion at a given initial concentration for a time period sufficient to stain the silicone hydrogel contact lens; (e) determining the concentration of carboxyl groups per each coated silicone hydrogel contact lens and/or the thickness of the coating on each coated silicone hydrogel contact lens; (f) if the concentration determined in step (e) of carboxyl groups per each coated silicone hydrogel contact lens is higher than a predetermined carboxyl concentration criteria and/or if the thickness determined in step (e) of the coating on each coated silicone hydrogel contact lens is thinner than a predetermined thickness criteria, repeating optimization cycles each consisting of steps (b) to (e) until both the concentration of carboxyl groups per each coated silicone hydrogel contact lens and the thickness of the coating on each coated silicone hydrogel contact lens meet the criteria, provided that coating conditions in step (b) is changed in each optimization repeating cycle.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

BRIEF DESCRIPTION OF THE DRAWING

FIG. 1 is an image of a cross section of a PAA-coated lens which is stained with a THA ethanol solution according to a preferred embodiment of the invention.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

A "silicone hydrogel contact lens" refers to a contact lens comprising a silicone hydrogel material.

A "hydrogel" refers to a crosslinked polymeric material which is not water-soluble and can contains at least 10% by weight of water within its polymer matrix when fully hydrated.

A "non-silicone hydrogel" refers to a hydrogel that is free of silicone.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl methacryloyl

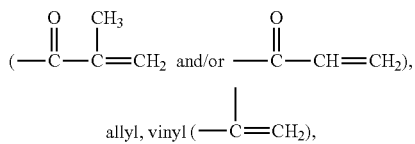

styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a medium and high molecular weight compound or polymer that contains ethylenically unsaturated groups. Medium and high molecular weight typically means average molecular weights greater than 700 Daltons.

A "polymer" means a material formed by polymerizing/crosslinking one or more monomers or macromers or prepolymers.

"Molecular weight" of a polymeric material (including monomeric or macromeric materials), as used herein, refers to the weight-average molecular weight unless otherwise specifically noted or unless testing conditions indicate otherwise.

The term "carboxyl" refers to the carboxyl group (—COOH).

The term "$C_1$-$C_4$ alcohol solution" in reference to a dye solution means that the solvent for preparing the dye solution is a $C_1$-$C_4$ alcohol. It is understood that the $C_1$-$C_4$ alcohol as solvent for preparing a dye solution can comprise up to about 20% by weight, preferably about 10% by weight, more preferably about 5% by weight, even more preferably about 2% by weight of water.

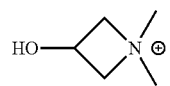

An "azetidinium group" refers to a positively charged group of

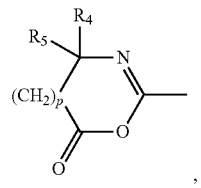

An "azlactone group" refers to a mono-valent radical of in which p is 0 or 1; $R_4$ and $R_5$ independently can be an alkyl group having 1 to 14 carbon atoms, a cycloalkyl group having 3 to 14 carbon atoms, an aryl group having 5 to 12 ring atoms, an arenyl group having 6 to 26 carbon and 0 to 3 sulfur, nitrogen and/or oxygen atoms, or $R_3$ and $R_4$ taken together with the carbon to which they are joined can form a carbocyclic ring containing 4 to 12 ring atoms The term "reactive vinylic monomer" refers to a vinylic monomer having a reactive functional group selected from the group consisting of carboxyl groups (—COOH), azetidinium group, amino groups (i.e., primary and/or secondary amino groups), azlactone groups, isocyanate groups, epoxy groups, aziridine groups, or combinations thereof.

The term "non-reactive hydrophilic vinylic monomer" refers to a hydrophilic vinylic monomer which is free of any carboxyl group or amino group (i.e., primary or secondary amino group). A non-reactive vinylic monomer can include a tertiary or quaternium amino group.

The term "water-soluble" in reference to a polymer or polymeric material means that the polymer or polymeric material can be dissolved in water to an extent sufficient to form an aqueous solution having a concentration of at least about 0.2% by weight at room temperature (i.e., from about 22° C. to about 28° C., preferably from about 24° C. to about 26° C., in particular at about 25° C.).

A "water contact angle" refers to an average water contact angle (i.e., contact angles measured by Sessile Drop method), which is obtained by averaging measurements of contact angles with at least 3 measurements.

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

The invention is generally directed to a method for qualifying and quantifying carboxyl groups on lens surface and uses thereof. The invention is partly based on the discoveries that a positively-charged dye with acetate as counter ion (e.g., thionin acetate (THA)) can be used in selectively to stain the carboxyl-containing coating of a silicone hydrogel contact lens. It was found that a solution (in a $C_1$-$C_4$ alcohol) of a positively-charged dye with acetate counter anion, thionin acetate, can stains the carboxyl-containing coating layer without staining the carboxyl-free bulk material of the silicone hydrogel contact lens, whereas its solution in water can stain both the carboxyl-containing coating layer and the carboxyl-containing lens bulk material of a silicone hydrogel contact lens with a carboxyl containing coating thereon. It allows for (1) quickly checking if carboxyl-containing coating layer is formed; (2) evaluating carboxyl-containing coating layer by qualifying carboxyl; (3) quantifying carboxyl density on lens surface; (4) determining the thickness of a carboxyl-containing coating layer; (5) establishing model to study surface wettability/lubricity vs. carboxyl density; and (6) providing feedback information for coating material design and synthesis.

The invention, in one aspect, provides a method for qualifying and quantifying carboxyl groups on the surfaces of a silicone hydrogel contact lens, comprising the steps of: (a) obtaining silicone hydrogel contact lenses each of which comprises a silicone hydrogel lens body (i.e., bulk material) and a coating thereon, wherein the silicone hydrogel lens body is obtained from a lens formulation free of any polymerizable component including one or more carboxyl groups, wherein the coating comprises a polymer having carboxyl groups; (b) immersing a given number of the silicone hydrogel contact lenses in a fixed volume of a $C_1$-$C_4$ alcohol solution of a positively-charged dye having acetate as counter anion at a given initial concentration for a time period sufficient to stain the silicone hydrogel contact lens; and (c) determining the concentration of carboxyl groups per each silicone hydrogel contact lens.

In accordance with the invention, a "silicone hydrogel lens body" refers to a preformed silicone hydrogel contact lens that has not been subjected to any surface modification posterior to the lens-forming process well known to a person skilled in the art. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses. For production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

Numerous SiHy lens formulations have been described in numerous patents and patent applications published by the filing date of this application. All of them can be used in obtaining a preformed SiHy lens which in turn becomes the inner layer of a SiHy contact lens of the invention, so long as they will yield a SiHy material free of carboxyl group(s). A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, filcon II 3, can also be used in making preformed SiHy contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. Pat. Nos. 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, a polymer as a coating material must comprises carboxyl groups and optionally hydrophobic moieties and/or segments that can maintains the polymer's affinity (i.e., binding) with one or more of monomeric units of a lens material to be coated so as to form a coating on the contact lens. Examples of hydrophobic moieties and/or segments include $C_8$-$C_{20}$ alkyl groups, tris(trialkylsilyloxy)silyl, di(trialkylsilyloxy)silyl, polydimethylsiloxane, polyproplene oxide, polybutylene oxide, and combinations thereof.

In a preferred embodiment, such a coating polymer further comprises (1) multiple reactive functional groups that can participate in a coupling reaction with the reactive functional groups of a reactive hydrophilic polymeric material in the presence or absence of a coupling agent to form a crosslinked polymeric coating; preferably selected from the group consisting of azetidinium group, amino groups (i.e., primary and/or secondary amino groups), azlactone groups, isocyanate groups, epoxy groups, aziridine groups, thiol groups, hydroxyl groups, and combinations thereof, more preferably selected from the group consisting of azetidinium groups, amino groups, azlactone groups, isocyanate groups, epoxy groups, aziridine groups, thiol groups, and combinations thereof, even more preferably selected from the group consisting of azetidinium group, amino groups, epoxy groups, thiol groups, and combinations thereof, most preferably selected from the group consisting of azetidinium group, amino groups, epoxy groups, thiol groups, and combinations thereof.

It is believed that the carboxyl groups of a polymer can interact with amide-type vinylic monomeric units in the lens material through either ionic/polar interaction or hydrogen bonding to maintain an affinity to the lens material; that the carboxyl groups of a polymer can interact with ammonium-containing vinylic monomeric units in the lens material through ionic/ionic interactions and hydrogen bonding to maintain an affinity to the lens material; and that the hydrophobic moieties or segments of a polymeric coating material can interact with silicone components in the lens material through hydrophobic-hydrophobic interactions to maintain an affinity to the lens material.

Amide-containing vinylic monomers have been widely used in making contact lenses. Preferred examples of amide-type vinylic monomers includes without limitation N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, N-vinyl-2-pyrrolidone (NVP), N-vinyl formamide, N-vinyl acetamide, N-vinyl isopropylamide, N-vinyl-N-methyl acetamide, and mixtures thereof.

An "ammonium group" refers to an acidified primary, secondary or tertiary amino group. Examples of ammonium-containing vinylic monomers include without limitation allylamine, vinylamine, trimethylammonium 2-hydroxy propylmethacrylate, amino-$C_2$-$C_4$ alkyl (meth)acrylate, $C_1$-$C_4$ alkylamino-$C_2$-$C_4$ alkyl (meth)acrylate, vinylamine, amino-$C_2$-$C_4$ alkyl (meth)acrylamide, $C_1$-$C_4$ alkylamino-$C_2$-$C_4$ alkyl (meth)acrylamide, di($C_1$-$C_4$ alkyl)amino-$C_2$-$C_4$ alkyl (meth)acrylate, tri($C_1$-$C_4$ alkyl)amino-$C_2$-$C_4$ alkyl (meth)acrylate, and mixtures thereof.

Examples of carboxyl-containing vinylic monomers include without limitation acrylic acid, a $C_1$-$C_4$ alkylacrylic acid (e.g., methacrylic acid, ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, and combination thereof.

Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silylcarbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth)acrylamide monomers of formula (1) are N-[tris(trimethylsiloxy)silylpropyl]acrylamide, TRIS, N-[2-hydroxy-3-(3-(t-butyldimethylsilyl)propyloxy)propyl] acrylamide.

Any polymer having carboxyl groups and optionally hydrophobic moieties and/or segments can be used in the invention so long as it can be dissolved in a solvent at room temperature in an amount of from about 0.001% to about 1.5%, preferably from about 0.002% to about 1%, more preferably from 0.003% to about 0.5% by weight relative to the total weight of the organic-based coating solution.

It is understood that a polymer coating material can comprise monomeric units of one or more reactive vinylic monomers so as to have multiple reactive functional groups. Exemplary reactive vinylics includes azetidinium-containing vinylic monomers, azlactone-containing vinylic monomers, isocyanate-containing vinylic monomers, epoxy-containing vinylic monomers, and aziridinyl-containing vinylic monomers. Examples of aziridinyl-containing vinylic monomers include without limitation 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, and 8-(1-aziridinyl) octyl (meth)acrylate). Examples of epoxy-containing vinylic monomers include without limitation glycidyl (meth)acrylate, vinyl glycidyl ether, allyl glycidyl ether. Examples of isocyanate-containing vinylic monomers include without limitation 2-isocyanatoethyl (meth)acrylate, 3-isocyanatopropyl (meth)acrylate, 4-isocyanatobutyl (meth)acrylate, 6-isocyanatohexyl (meth)acrylate, 1-methyl-2-isocyanatoethyl methacrylate, and 1,1-dimethyl-2-isocyanatoethyl methacrylate. Examples of azlactone-containing vinylic monomers include without limitation 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers. Azetidinium-containing vinylic monomers can be obtained by reacting epichlorohydrin with a vinylic monomer containing primary or secondary amino groups (any those described above) according to procedures similar to what described in EP1465931 (herein incorporated by reference in its entirety).

Preferably, a polymer as a coating material is a polymer or copolymer comprising at least about 70% by mole, preferably at least about 80% by mole, more preferably at least about 90% by mole, even more preferably at least about 95% by mole of monomeric units of one or more carboxyl-containing vinylic monomers selected from the group consisting of acrylic acid, a $C_1$-$C_4$ alkylacrylic acid (e.g., methacrylic acid, ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, and combination thereof. Examples of preferred carboxyl-containing polymers as coating materials include without limitation linear or branched polyacrylic acid; linear or branched polymethacrylic acid; linear or branched poly(acrylic acid-co-acrylamide) having at least about 70% by mole, preferably at least about 80% by mole, more preferably at least about 90% by mole, even more preferably at least about 95% by mole of acrylic acid; linear or branched poly(methacrylic acid-co-acrylamide) having at least about 70% by mole, preferably at least about 80% by mole, more preferably at least about 90% by mole, even more preferably at least about 95% by mole of methacrylic acid; linear or branched poly(acrylic acid-co-vinylpyrrolidone) having at least about 70% by mole, preferably at least about 80% by mole, more preferably at least about 90% by mole, even more preferably at least about 95% by mole of acrylic acid; linear or branched poly(methacrylic acid-co-vinylpyrrolidone) having at least about 70% by mole, preferably at least about 80% by mole, more preferably at least about 90% by mole, even more preferably at least about 95% by mole of methacrylic acid.

In accordance with the invention, the weight average molecular weight $M_w$ of a polymer as a coating material is at least about 10,000 Daltons, more preferably at least about 50,000 Daltons, even more preferably from about 100,000 to 5,000,000 Daltons.

A coating of a polymer having carboxyl groups can be form on a silicone hydrogel contact lens by contacting the contact lens with a solution of the polymer. Contacting of a contact lens with a coating solution of a polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

A solution of a polymer for forming a coating on contact lenses can be prepared by dissolving one or more polymers in water, a mixture of water and an organic solvent miscible with water, an organic solvent, or a mixture of one or more organic solvent. Preferably, the polymer is dissolved in a mixture of water and one or more organic solvents, an organic solvent, or a mixture of one or more organic solvent. It is believed that a solvent system containing at least one organic solvent can swell a silicone hydrogel contact lens so that a portion of the reactive polymer may penetrate into the silicone hydrogel contact lens and increase the durability of the coating.

Any organic solvents can be used in preparation of a solution of the polymer. Examples of organic solvents include without limitation tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, methanol, ethanol, 1- or 2-propanol, 1- or 2-butanol, tert-butanol, tert-amyl alcohol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

In accordance with the invention, any positively-charged dye can be used in the invention, so long as its counter anion is acetate. Preferably, thionin acetate is used in the invention.

A $C_1$-$C_4$ alcohol solution of a positively charged dye can be prepared by dissolving a desired amount of the dye in a $C_1$-$C_4$ alcohol which is methanol, ethanol, n-propanol, isopropanol, or a mixture thereof. A person skilled in the art knows well how to select a concentration suitable for the invention based on the detection method such as UV/visible absorption spectroscopy or fluorescence spectroscopy.

In accordance with the invention, at least one, preferably at least 3, more preferably from 3 to 12 silicone hydrogel contact lenses are immersed in a given volume (e.g., from about 1 ml to about 10 ml) from about 1 ml to about, of a $C_1$-$C_4$ alcohol solution of a positively-charged dye. The immersion time is at least from about one hour to about 24 hours, preferably from about 2 hours to about 15 hours, more preferably from about 5 hours to about 10 hours.

The concentration (nano-moles per lens) of carboxyl groups in the coating of a silicone hydrogel contact lens can be determined spectroscopically by determining the decrease in absorbance or fluorescence at one or more wavelengths of the dye in the $C_1$-$C_4$ alcohol solution after the given time period of immersion of the lenses therein, as illustrated in Examples. A person skilled in the art knows well how to determine the concentration of carboxyl groups on a silicone hydrogel contact lens.

It is believed that thionin acetate (THA), a positively charged redox dye, is a very sensitive fluorescent label for the quantitative determination of carboxyl concentration on the surface of a contact lens according to the reaction shown below.

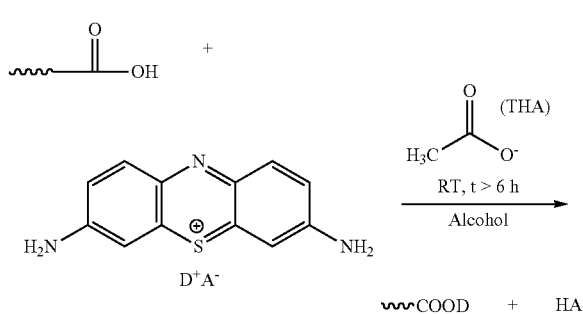

The decrease in UV/vis absorbance or fluorescence (emission) intensity is proportional to the number of the contact lenses immersed in the $C_1$-$C_4$ alcohol solution and to the amount of THA by each contact lenses. Because of 1:1 stoichiometry between THA cation and carboxylic group on a contact lens, the decrease in UV/vis absorbance or fluorescence (emission) intensity correlates well with the concentration of the carboxyl group on a contact lens, as illustrated in Examples.

The thickness of the carboxyl-containing coating on the stained contact lens can be determined according to any methods known to a person skilled in the art. For example, because HAD alcohol solution stains selectively the carboxyl-containing coating over the carboxyl-free bulk lens material, the stained coating on a contact lens will appear darker than the bulk material of the contact lens when examining a cross-section of the contact lens. It is understood that the determining factors for the accuracy of thickness measurement include: whether a perfectly orthogonal cut of the lens can be performed; whether the vertical-standing of the cutting-lens can be maintained for microscopic measurements; and whether lens edge can be well focused under microscopy.

It should be understood that although various embodiments including preferred embodiments of the invention may be separately described above, they can be combined and/or used together in any desirable fashion in the method of the invention.

In another aspect, the invention provides a method for selecting a candidate polymer comprising carboxyl groups as a coating material for silicone hydrogel contact lenses, comprising the steps of: (a) obtaining uncoated silicone hydrogel contact lenses each of which comprises a silicone hydrogel lens body (i.e., bulk material) obtained from a lens formulation free of any polymerizable component including one or more carboxyl groups; (b) obtaining candidate polymers each having carboxyl groups; (c) applying a coating of each candidate polymer onto each silicone hydrogel contact lenses to obtain coated silicone hydrogel contact lenses under identical coating conditions; (d) immersing a given number of the coated silicone hydrogel contact lenses for each candidate polymers in a fixed volume of a $C_1$-$C_4$ alcohol solution of a positively-charged dye having acetate as counter anion at a given initial concentration for a time period sufficient to stain the silicone hydrogel contact lens; (e) determining the surface concentration of carboxyl groups per each silicone hydrogel contact lens and/or the thickness of the coating on each coated silicone hydrogel contact lens for each candidate polymers; (f) selecting one candidate polymer that provides coated silicone hydrogel contact lens having a surface concentration of carboxyl lower than a predetermined criteria and/or a desired coating thickness.

In accordance with the invention, an "uncoated silicone hydrogel contact lens" means a preformed silicone hydrogel contact lens that has not been subjected to any surface modification posterior to the lens-forming process well known to a person skilled in the art. All of the various embodiments including preferred embodiments of a preformed silicone hydrogel contact lens described above for the previous aspect of the invention can used in this aspect of the invention.

Various embodiments including preferred embodiments of polymers as coating materials, coating solutions, methods for applying a coating on a contact lens, positively-charged dyes including HTA lenses, $C_1$-$C_4$ alcohol solution of dyes, methods for determining the surface concentration of carboxyl groups per each silicone hydrogel contact lens and/or the thickness of the carboxyl-containing coating on coated silicone hydrogel contact lens are described above and can be combined and/or used together in this aspect of the invention.

In a further aspect, the invention provides a method for optimizing a coating process for producing silicone hydrogel contact lenses with a coating thereon, comprising the steps of: (a) obtaining uncoated silicone hydrogel contact lenses each of which comprises a silicone hydrogel lens body (i.e., bulk material) obtained from a lens formulation free of any polymerizable component including one or more carboxyl groups; (b) obtaining a polymer having carboxyl groups; (c) applying a coating of the polymer onto each silicone hydrogel contact lenses to obtain coated silicone hydrogel contact lenses under first coating conditions; (d) immersing a given number of the coated silicone hydrogel contact lenses in a fixed volume of a $C_1$-$C_4$ alcohol solution of a positively-charged dye having acetate as counter anion at a given initial concentration for a time period sufficient to stain the silicone hydrogel contact lens; (e) determining the concentration of carboxyl groups per each coated silicone hydrogel contact lens and/or the thickness of the coating on each coated silicone hydrogel contact lens; (f) if the concentration determined in step (e) of carboxyl groups per each coated silicone hydrogel contact lens is higher than a predetermined carboxyl concentration criteria and/or if the thickness determined in step (e) of the coating on each coated silicone hydrogel contact lens is thinner than a predetermined thickness criteria, repeating optimization cycles each consisting of steps (b) to (e) until both the concentration of carboxyl groups per each coated silicone hydrogel contact lens and the thickness of the coating on each coated silicone hydrogel contact lens meet the criteria, provided that coating conditions in step (b) is changed in each optimization repeating cycle.

Various embodiments including preferred embodiments of uncoated silicone hydrogel contact lens, polymers as coating materials, coating solutions, methods for applying a coating on a contact lens, positively-charged dyes including HTA lenses, $C_1$-$C_4$ alcohol solution of dyes, methods for determining the surface concentration of carboxyl groups per each silicone hydrogel contact lens and/or the thickness of the carboxyl-containing coating on coated silicone hydrogel contact lens are described above and can be combined and/or used together in this aspect of the invention.

Coating conditions, which can affect the surface concentration of carboxyl groups on resultant coated contact lenses and/or the thickness of the coating on resultant coated contact lenses, include without limitation the concentration of a polymer as a coating material, the composition of a polymer as a coating material, the molecular weight of a polymer as a coating material, the solvent used in preparing a coating solution of a polymer as a coating material, and the contacting time of a silicone hydrogel contact lens with a coating solution. The thickness criteria (i.e., lowest thickness) of a carboxyl-containing coating is one value selected from about 0.1 to about 20 micrometers, preferably from about 0.2 to about 15 micrometers, more preferably from about 0.5 to about 10 micrometers, even more preferably from about 1 to about 10 micrometers, whereas the surface concentration criteria (i.e., up concentration limit) of carboxyl groups on a coated contact lens is about 200 nano-moles per lens, preferably about 100 nano-moles per lens, more preferably about 75 nano-moles per lens, even more preferably about 50 nano-moles per lens.

The surface concentration of carboxyl groups on resultant coated contact lenses and the thickness of the coating on resultant coated contact lenses both increase as the concentration of a polymer as a coating material in a coating solution increases, if other coating conditions are kept constant.

The surface concentration of carboxyl groups on resultant coated contact lenses and the thickness of the coating on resultant coated contact lenses both increase as the molecular weight of a polymer as a coating material in a coating solution increases, if other coating conditions are kept constant.

The surface concentration of carboxyl groups on resultant coated contact lenses and the thickness of the coating on resultant coated contact lenses both increase as the solvent used in preparing a coating solution of a polymer as a coating material contains less amount of water, if other coating conditions are kept constant.

The surface concentration of carboxyl groups on resultant coated contact lenses decreases as polymer as a coating material comprises less amount of carboxyl groups, if other coating conditions are kept constant.

The surface concentration of carboxyl groups on resultant coated contact lenses and the thickness of the coating on resultant coated contact lenses both increase as the contacting time of a silicone hydrogel contact lens with a coating solution increases, if other coating conditions are kept constant.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

EXAMPLE 1

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. About 0.235 g of DBTDL is added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

EXAMPLE 2

Preparation of Lens Formulations

A lens formulation is prepared by dissolving components in 1-propanol to have the following composition: about 32% by weight of CE-PDMS macromer prepared in Example 1, about 21% by weight of N-[tris(trimethylsiloxy)-silylpropyl]acrylamide (TRIS-Am), about 23% by weight of N,N-dimethylacrylamide (DMA), about 0.6% by weight of N-(carbonyl-methoxypolyethylene glycol-2000)-1,2-disteaoyl-sn-glycero-3-phosphoethanolamin, sodium salt) (L-PEG), about 1% by weight of Darocur 1173 (DC1173), about 0.1% by weight of visitint (5% copper phthalocyanine blue pigment dispersion in tris(trimethylsiloxy)silylpropyl-methacrylate, TRIS), about 0.8% by weight of 1,2-dimyristoyl-sn-glycero-3-phosphocholine (DMPC), about 200 ppm of 1-hydroxy-2,2,6,6-tetramethyl-piperidine (H-tempo), and about 22% by weight of 1-propanol.

Preparation of Uncoated Contact Lenses

Lenses are prepared by cast-molding from the lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradiation (13.0 mW/cm$^2$) for about 24 seconds. Cast-molded contact lenses are then extracted by dipping in the following series of baths: DI water bath (about 56 seconds); 6 MEK baths (about 44, 56, 56, 56, 56, and 56 second respectively).

PAA-Coating Solution.

A polyacrylic acid (PAA) coating solution is prepared by dissolving an amount of PAA (M.W.: 450 kDa, from Lubrizol) in a given volume of 1-propanol (1-PrOH) to have a concentration of about 0.44% by weight and the pH is adjusted with formic acid to about 2.0.

PMAA-Coating Solution.

A polymethacrylic acid (PMAA) coating solution is prepared by dissolving an amount of PMAA (M.W.: 300-600 kDa, from Polysciences, Inc.) in a given volume of 1-propanol/water (94%/6% wt/wt) mixture to have a concentration of about 0.011% by weight and the pH is adjusted with formic acid to about 2.0.

PAA-Coated Lenses.

Cast-molded and MEK-extracted contact lenses as above are coated by dipping in the following series of baths: DI water bath (about 56 seconds); one bath of PAA coating solution (about 0.44% by weight, acidified with formic acid to about pH 2.0) in 100% 1-propanol (about 44 seconds); one bath of a water/1-propanol 50%/50% mixture (about 56 seconds); 4 DI water baths each for about 56 seconds; one PBS bath for about 56 seconds; and one DI water bath for about 56 seconds.

PMAA-Coated Lenses.

Cast-molded and MEK-extracted contact lenses as above are coated by dipping in the following series of baths: DI water bath (about 56 seconds); one bath of PMAA coating solution prepared above (about 44 seconds); one bath of a water/1-propanol 50%/50% mixture (about 56 seconds); 4 DI water baths each for about 56 seconds; one PBS bath for about 56 seconds; and one DI water bath for about 56 seconds.

EXAMPLE 3

Staining of Silicone Hydrogel Contact Lenses

3a. Dyes Used

This example illustrates screen dyes for selecting one dye that only can stain the coating layer with carboxyl function groups, not stain the lens bulk. Five dyes: Ethidiumbromid (designated EB, Mw=394.31, purity 95%); Thionin (designated THA, Mw=287.34, purity 85%); Acriflavin (designated AFN, Mw=259.7, purity 90%); Methylene Blue (designated MB, Mw=373.9, purity 97%); and Toluidine Blue 0 (designated TB, Mw=305.83, purity 80%); have been used to screen a dye for this purpose.

3b. Preparation of Dye Solutions

Two solvents are used to prepare the dye solutions. Dye solutions have been prepared by dissolving an amount of a dye in a solvent, ethanol (EtOH) or water, at room temperature (RT) as shown in the table below. All the dye concentration of the solutions is 0.1 mg/ml (100 ppm).

| Ethanol solvent | | | Water solvent | | | | |
| --- | --- | --- | --- | --- | --- | --- | --- |
| 1 | 2 | 3 | 4 | 5 | 6 | 7 | 8 |
| EB | THA | AFN | EB | THA | AFN | MB | TB |

3c. Staining of Silicone Hydrogel Contact Lenses

To find a dye system that only stains coating layer without staining of lens bulk, both uncoated lenses (control) prepared in Example 2 (extracted-only) and PAA-coated lenses prepared in Example 2 are subject to staining. The dye option is based on the criteria: only staining on lens surface without staining of lens bulk.

There are four steps to check the staining effect of lenses. (1) Dry the lenses in a vacuum oven. (2) Soak three dry lenses, uncoated or PAA-coated lenses, in 10 g of 100 ppm dye solution using 20 ml glass vial with PTFE lined caps. The vials then are placed in a gently moving shaker (Precision Scientific 360 Orbital Shaker Bath) for about 17 hours at room temperature (RT). The shaker speed is controlled at 80 rpm. (3) Wash lens by placing the lens in 200 ml ethanol (EtOH) for about 5 minute, transferring lens in 200 ml EtOH/water (50%/50% v/v) mixture for about 5 min, and soaking in 200 ml water for about 2 hours. (4) Record the qualitative staining effect via visual check.

The staining effect for both uncoated and PAA-coated lenses has been reported in the table below. Screening results (5 dyes applied to extracted-only and PAA-coated FT-32)

|  | Uncoated Lenses | PAA-coated Lenses |
| --- | --- | --- |
| EB-ethanol | Not stained | Not stained |
| THA-ethanol | Not stained | Purple |
| AFN-ethanol | Not stained | Not stained |
| EB-water | Slightly pink | pink |
| THA-water | Slightly blue | Dark blue |
| AFN-water | Yellow | Very yellow |
| MB-water | Slightly blue | Dark blue |
| TB-water | blue | Dark blue |

Thionin acetate (THA) is known as a positively charged redox dye. From staining experiments, THA ethanol solution only stains PAA-coated lens, not the uncoated lens. It is sensitive to differentiate PAA-coated and uncoated lenses. Thus Thionin acetate (THA) has been picked up for the qualitative and quantitative determination of carboxyl functional groups on the lens surface. It works as an indicator of carboxylic acid after PAA or PMAA surface coating.

EXAMPLE 4

Staining of Silicone Hydrogel Contact Lenses by THA Ethanol Solution

4a. Preparation of THA Solution

Thionin acetate (THA) is purchased from Sigma-Aldrich and ethanol is purchased from EMD. Both chemicals are used as received. A 100 ppm THA ethanol solution is prepared by dissolving about 0.01 g of THA solid in 99.99 g of ethanol. After stirring about 2 h at room temperature, the amber bottle is sealed using Parafilm and wrapped up with aluminum foil. Fresh solution is used always.

4b. Staining of Silicone Hydrogel Contact Lenses

Three dry lenses are soaked in 10 g of 100 ppm THA ethanol solution in a 20 ml glass vial with PTFE lined cap. The aluminum wrapped vial then is placed in a gently moving shaker (Precision Scientific 360 Orbital Shaker Bath) for 17 hours at RT. The shaker speed is controlled at 80 rpm. The THA dye is capable of being absorbed onto lens surface when carboxyl functional groups exist on lens surface, getting lens stained.

There are three steps to wash the lens. (1) Carefully transfer the lens from THA ethanol solution into 200 ml ethanol for about 5 minutes; (2) Carefully move the lens to 200 ml EtOH/water (50%/50% v/v) mixture for about 5 min; and (3) Soak the lens in 200 ml water for about 2 hours.

The experiments show that no noticeable staining of uncoated lenses by THA ethanol solution is observed; PAA-coated lenses prepared in Example 2 are stained by THA ethanol solution; PMAA-coated lenses prepared in Example 2 are lightly stained by THA ethanol solution.

EXAMPLE 5

Qualify Carboxyl Functional Groups on Lens Surface

Both soaking solutions and stained lenses in Example 4 are used for qualifying and quantifying carboxyl functional groups on lens surface. The stained lenses are used for qualifying carboxyl functional groups and quantifying coating layer thickness containing carboxyl functional groups. The soaked THA ethanol solution is used to determine carboxyl functionality on lens surface by measuring the absorption intensity decrease at 604 nm.

Methods used for qualifying and quantifying carboxylic acid on lens surface

| Purpose | Samples | Qualify and quantify carboxyl functional groups |
|---|---|---|
| Qualify carboxyl groups | Stained lens | The staining of lens indicates the carboxyl functional groups on lens surface |
| Quantify carboxyl groups | Lens soaked THA ethanol solution | The decrease of UV-Vis absorption intensity at 604 nm relates the consumption of THA by carboxyl groups on lens surface |
| Quantify the thickness of carboxyl groups coating | Stained lens | Measurement of stained thickness of lens cross-section by microscopy image |

Thionin acetate (THA), a positively charged redox dye, stained only the surface layer containing carboxyl functional groups in THA ethanol solution, not lens bulk. Both PAA and PMAA coated lenses prepared in Example 2 are stained. The color density relates to the density of carboxyl functionality. PAA-coated lens prepared in Example 2 and stained with THA ethanol solution is darker than PMAA-coated lens prepared in Example 2 and stained with THA ethanol solution. It demonstrates the higher density of carboxyl functional groups on PAA-coated lens. The lens color becomes pale after the stained PAA- or PMAA-coated lenses are autoclaved, indicating that some PAA or PMAA polymer is likely removed from the lens surface. THA staining is an indicator of carboxyl functional groups on lens surface after surface coating using carboxyl containing polymers.

EXAMPLE 6

Determination of Surface Concentration of Carboxyl Groups

The soaked THA ethanol solution is used to determine carboxyl functionality on lens surface by measuring the absorption intensity decrease at 604 nm.

6a. UV-Vis Absorption Property of THA Ethanol Solution after Lens Staining Process Ion pair formation occurs on the lens between the dye cation (T+) and the lens carboxylic acid groups. The carboxylic group content is calculated by subtracting the amount of dye due to lens absorbing (determine by UV-Vis scanning) in the staining solution assuming that there is a 1:1 stoichiometry between the THA cation and carboxyl group.

The loss of UV-Vis intensity at 604 nm of the staining solution is due to THA attachment onto lens surface with carboxyl functional groups. The decreased absorption intensity is used to calculate carboxyl functional group density on lens surface based on a THA calibration curve, absorption intensity vs. THA concentration in ethanol.

6b. Calibration Curve of THA Concentration

A 100 ppm THA ethanol solution is prepared by dissolving about 0.01 g THA solid in 99.99 g of ethanol. After stirring about 2 h at room temperature, the amber bottle is sealed using Parafilm and wrapped up with aluminum foil. Fresh solution is used always. Different concentration of THA ethanol solutions are then prepared by dilution.

The UV-Vis scanning of the THA ethanol solution is carried out using Cary 3E UV Vis Spectrophotometer by Varian. Absorption Intensity at 604 nm is collected for calibration curve. It also works as the system suitability test.

THA ethanol solutions of different THA concentration and the UV-Vis scanning

| THA (ppm) | Absorption Intensity at 604 nm |
|---|---|
| 10 | 2.55 |
| 9 | 2.309 |
| 8 | 2.051 |
| 7 | 1.806 |
| 6 | 1.523 |
| 5 | 1.274 |
| 4 | 1.03 |
| 3 | 0.773 |
| 2 | 0.515 |
| 1 | 0.256 |

The calibration curve is created by statistical analysis. The regression equation is [UV-Vis Intensity at 604 nm]=0.003000+0.2556 [THA] ppm (S=0.00855623; R-Sq=100%; R-Sq(adj)=100%) and it can be used as the predictor of THA concentration to the absorption intensity. The slop of the regression line, 0.2556, is the mean change in absorption intensity at 604 nm if THA concentration changes by 1 ppm.

An estimate of the average variability about the regression line is S, 0.00855623. It is the positive square of mean square error. The lower S will be, the better the equation predicts the THA concentration in solutions.

R-Sq, 100%, is the proportion of variability in absorption intensity explained by the regression equation. The linear relationship with THA concentration explains 100% of the variation in absorption intensity.

R-Sq(adj), 100%, is R-Sq adjusted, which is sensitive to the number of terms in the regression model. Both R-Sq and R-Sq(adj) are 100%. It means that absorption intensity has a very good linear relationship with THA concentration and the system suitability test hits the satisfied criteria.

6c. Determination of Surface Concentration of Carboxyl Groups

The Table below summarizes the UV-Vis scanning results and the calculation for determining carboxyl functional groups density on PAA- and PMAA-coated lenses prepared in Example 2 and also shows that autoclaving in PBS decreases carboxyl functional groups density on lens surface. In general, the phenomenon indicates that PAA or PMAA is coming off the lens surface during autoclaving into the saline.

| Test samples | UV-Vis at 604 nm* | Calculated [THA] from Regression analysis (ppm) X = (UV-Vis absorption intensity at 604 nm- 0.003)/0.2555 | Calculate actual [THA] leftover in 10 g THA (ppm) Y = X/(0.4/10) | Loss after THA staining on lens. 1 mg THA in original 10 g 100 ppm THA (mol) Z = [(1 − Y * 10/1000)/ 1000]/287.34 | COOH on each lens (nMol/Lens) (Z/3) * $10^9$ |
|---|---|---|---|---|---|
| 4 ppm THA ethanol solution(diluted 25 times) | 1.029 | 4.0157 | — | — | |
| PAA coated lens without autoclave | 0.996 | 3.89 | 97.16 | 9.8753E−08 | 32.9 |
| PAA coated lens autoclaved in PBS | 0.999 | 3.90 | 97.46 | 8.8537E−08 | 29.5 |
| PMAA coated without autoclave | 1.009 | 3.944 | 98.43 | 5.4485E−08 | 18.2 |
| PMAA coated lens autoclaved in PBS | 1.012 | 3.95 | 98.73 | 4.4269E−08 | 14.8 |

*UV-Vis scanning of soaked THA ethanol solution (all is diluted 25 times, 0.4 g THA ethanol solution is diluted to 10 g, supposed to 4 ppm)

6d. Reproducibility of Determination of Surface Concentration of Carboxyl Groups To evaluate the reproducibility of this method, additional three experiments are performed. Each group contains different number of lenses in 10 g of 100 ppm THA ethanol solution. PAA-coated lenses prepared in Example 2 without autoclaving are used for this purpose. Three groups of 10 g 100 ppm-THA ethanol solution are soaked with 6, 9, and 12 lenses respectively. The UV-Vis absorption intensity of the soaked THA ethanol solution decreases with the number of lenses, while the calculated carboxyl functional group density on each lens is comparable between 33-44 nMol/lens. This demonstrates that more THA is consumed because of more PAA-coated lenses. It is reproducible to measure carboxyl functional group density by this method.

Four groups with different number of PAA-coated lenses to check reproducibility

| Number of lenses | UV-Vis absorption intensity at 604 nm | Calculated COOH on lens surface (nMol/lens) | Average of COOH on lens surface (nMol/lens) |
|---|---|---|---|
| 3 | 0.996 | 32.9 | 37.8 |
| 6 | 0.946 | 44.8 | |
| 9 | 0.922 | 39.0 | |
| 12 | 0.904 | 34.3 | |

*UV-Vis scanning of soaked THA ethanol solution (all is diluted 25 times, 0.4 g of THA ethanol solution is diluted to 10 g, supposed to 4 ppm)

EXAMPLE 7

Determination of the Thickness of Carboxyl-Containing Coatings

THA ethanol solution can stain PAA- or PMAA-coated lenses, but the staining is only located on the surface due to ion exchange reaction between THA and carboxyl functional groups. It is believed that the stained thickness would indicate coating layer thickness.

7a. Images of the Cross-Section of Stained Lens

The cross-section of a stained lens is cut using two parallel blades. A perfectly orthogonal cut of the lens is important to make sure a vertical-standing of the cutting-lens under microscope. The images of the cross-section of stained lens are collected using Nikon E600 polarizing microscope. A typical image (with a magnification of 500×) of the cross-section of a stained PAA-coated lens prepared in Example 2 is shown in FIG. 1.

7b. Measurement of Coating Layer Thickness

The software of Image-Pro-PLUS 4.5 is used for the measurement of stained thickness. Because THA ethanol solution only stains carboxyl containing layer and does not stains the lens bulk, the stained thickness is an indicator of the thickness of carboxyl containing coated layer.

There are at least three challenges to measure the thickness of carboxyl containing coated layer. The first is to make a perfectly orthogonal cut of the lens; the second is to control the vertical-standing of the cutting-lens; and the third is to get lens edge well focused. Otherwise, measurement data will be the glitch of the "overhang" of the bevel.

Thickness of coating layer calculated from cross section using Image-Pro-PLUS software

| | | PAA coated lenses | | PMAA coated lenses | |
|---|---|---|---|---|---|
| | Features | without autoclave Length (μm) | with autoclave in PBS Length (μm) | without autoclave** Length (μm) | with autoclave in PBS Length (μm) |
| 1 | L1* | 132.9457 | 132.1224 | 0.9911957 | 152.0653 |
| 2 | L2* | 121.8486 | 125.881 | 0.7739938 | 150.1318 |
| 3 | L3 | 6.106218 | 4.210982 | 1.11627 | 1.038422 |
| 4 | L4 | 5.415745 | 3.348809 | 0.9911957 | 1.178912 |
| 5 | L5 | 5.683455 | 4.210982 | 1.038422 | 0.6922811 |
| 6 | L6 | 5.683455 | 4.210982 | 0.7739938 | 1.178912 |

-continued

Thickness of coating layer calculated from cross section using Image-Pro-PLUS software

|  |  | PAA coated lenses | | PMAA coated lenses | |
|---|---|---|---|---|---|
|  | Features | without autoclave Length (μm) | with autoclave in PBS Length (μm) | without autoclave** Length (μm) | with autoclave in PBS Length (μm) |
| 7 | L7 | 4.99211 | 4.210982 | 1.11627 | 0.9026241 |
| 8 | L8 | 6.375003 | 3.610497 | 1.11627 | 1.038422 |
| 9 | L9 | 5.683455 | 4.210982 | 1.209017 | 0.8336168 |
| 10 | L10 | 5.263158 | 3.779119 | 1.11627 | 0.9790333 |
| Average (um) |  | 5.639 | 3.879 | 1.0242898 | 0.979 |

*(L1 − L2)/2 for average
**all data in this column are direct coating thickness

EXAMPLE 8

Determination of Carboxyl Functionality and Coating Layer Thickness of PAA and PMAA Coated Lens PAA-coating solution contains 0.44% (wt) PAA in 1-PrOH, while PMAA coating solution contains 0.011% (wt) PMAA in 1-PrOH/water (94%/6% wt/wt) mixture. It can be anticipated that both carboxyl functionality and coating layer thickness on PAA coated lens would be higher than PMAA coated lens.

|  | Calculated COOH amount on lens surface (nMol/lens) | Measured coating thickness (μm) |
|---|---|---|
| PAA-coated without autoclave | 37.8 | 5.639 |
| PAA-coated with PBS autoclave | 29.5 | 3.879 |
| PMAA-coated without autoclave | 18.2 | 1.024 |
| PMAA-coated with PBS autoclave | 14.8 | 0.979 |

What is claimed is:

1. A method for determining the thickness of carboxyl group-containing on the surfaces of silicone hydrogel contact lenses comprising the steps of:
   (a) obtaining silicone hydrogel contact lenses each of which comprises a silicone hydrogel lens body and a coating thereon, wherein the silicone hydrogel lens body is obtained from a lens formulation free of any polymerizable component including one or more carboxyl groups, wherein the coating comprises a polymer having carboxyl groups;
   (b) drying the silicone hydrogel contact lenses;
   (c) selectively staining the coatings over the lens bodies of a given number of the dry silicone hydrogel contact lenses by first immersing them in a fixed volume of a $C_1$-$C_4$ alcohol solution of a positively-charged dye having acetate as its counter anion at a given initial concentration for a time period of from about one hour to about 24 hours and then washing them in a consecutive order with ethanol, a mixture of ethanol/water at a ratio of 50%/50% by volume, and water to achieve staining the coating without out staining the lens body;
   (d) orthogonally cutting the silicone hydrogel contact lenses and the selectively stained coating; and
   (e) determining the thickness of the coating on the silicone hydrogel contact lens.

2. The method of claim 1, wherein the positively-charged dye having acetate as its counter anion is thionin acetate.

3. The method of claim 2, wherein the $C_1$-$C_4$ alcohol solution of the positively charged dye is prepared by dissolving a desired amount of the dye in a $C_1$-$C_4$ alcohol which is methanol, ethanol, n-propanol, isopropanol, or a mixture thereof.

4. The method of claim 3, wherein the $C_1$-$C_4$ alcohol is ethanol.

5. The method of claim 1, wherein the $C_1$-$C_4$ alcohol solution of the positively-charged dye is prepared by dissolving a desired amount of the dye in a $C_1$-$C_4$ alcohol which is methanol, ethanol, n-propanol, isopropanol, or a mixture thereof.

6. The method of claim 1, wherein in step (b) at least 3 silicone hydrogel contact lenses are immersed in the $C_1$-$C_4$ alcohol solution of the positively-charged dye.

7. A method for selecting a candidate polymer comprising carboxyl groups as a coating material for silicone hydrogel contact lenses, comprising the steps of:
   (a) obtaining uncoated silicone hydrogel contact lenses each of which comprises a silicone hydrogel lens body obtained from a lens formulation free of any polymerizable component including one or more carboxyl groups;
   (b) obtaining candidate polymers each having carboxyl groups;
   (c) applying a coating of each candidate polymer onto each silicone hydrogel contact lenses to obtain coated silicone hydrogel contact lenses under identical coating conditions;
   (d) drying the coated silicone hydrogel contact lenses;
   (e) selectively staining the coatings over the lens bodies of a given number of the coated silicone hydrogel contact lenses for each candidate polymers by immersing them in a fixed volume of a $C_1$-$C_4$ alcohol solution of a positively-charged dye having acetate as its counter anion at a given initial concentration for a time period of from about one hour to about 24 hours and then washing them in a consecutive order with ethanol, a mixture of ethanol/water at a ratio of 50%/50% by volume, and water to achieve staining the coating without out staining the lens body;
   (f) orthogonally cutting the silicone hydrogel contact lenses and the selectively stained coating;
   (g) determining the thickness of the coating on each coated silicone hydrogel contact lens for each candidate polymers; and
   (h) selecting one candidate polymer that provides coated silicone hydrogel contact lens having the desired coating thickness.

8. The method of claim 7, wherein the positively-charged dye having acetate as its counter anion is thionin acetate.

9. The method of claim 7, wherein the $C_1$-$C_4$ alcohol solution of the positively charged dye is prepared by dissolving a desired amount of the dye in a $C_1$-$C_4$ alcohol which is methanol, ethanol, n-propanol, isopropanol, or a mixture thereof.

10. The method of claim 9, wherein the $C_1$-$C_4$ alcohol is ethanol.

11. The method of claim 7, wherein in step (d) at least at least 3 silicone hydrogel contact lenses are immersed in the $C_1$-$C_4$ alcohol solution of the positively-charged dye.

12. A method for optimizing a coating process for producing silicone hydrogel contact lenses with a coating thereon, comprising the steps of:
(a) obtaining uncoated silicone hydrogel contact lenses each of which comprises a silicone hydrogel lens body obtained from a lens formulation free of any polymerizable component including one or more carboxyl groups;
(b) obtaining a polymer having carboxyl groups;
(c) applying a coating of the polymer onto each silicone hydrogel contact lenses to obtain coated silicone hydrogel contact lenses under first coating conditions;
(d) immersing a given number of the coated silicone hydrogel contact lenses in a fixed volume of a $C_1$-$C_4$ alcohol solution of a positively-charged dye having acetate as its counter anion at a given initial concentration for a time period sufficient to stain the silicone hydrogel contact lens;
(e) drying the coated silicone hydrogel contact lenses;
(f) selectively staining the coatings over the lens bodies of a given number of the dry coated silicone hydrogel contact lenses by first immersing them immersing them in a fixed volume of a $C_1$-$C_4$ alcohol solution of a positively-charged dye having acetate as its counter anion at a given initial concentration for a time period of from about one hour to about 24 hours and then washing them in a consecutive order with ethanol, a mixture of ethanol/water at a ratio of 50%/50% by volume, and water to achieve staining the coating without out staining the lens body;
(g) orthogonally cutting the silicone hydrogel contact lenses and the selectively stained coating;
(h) determining the thickness of the coating on each coated silicone hydrogel contact lens;
(i) if the thickness determined in step (h) of the coating on each coated silicone hydrogel contact lens is thinner than a predetermined thickness criteria, repeating optimization cycles each consisting of steps (b) to (h) until the thickness of the coating on each coated silicone hydrogel contact lens meet the criteria, provided that coating conditions in step (b) is changed in each optimization repeating cycle.

13. The method of claim 12, wherein the positively-charged dye having acetate as its counter anion is thionin acetate.

14. The method of claim 12, wherein the $C_1$-$C_4$ alcohol solution of the positively charged dye is prepared by dissolving a desired amount of the dye in a $C_1$-$C_4$ alcohol which is methanol, ethanol, n-propanol, isopropanol, or a mixture thereof.

15. The method of claim 14, wherein the $C_1$-$C_4$ alcohol is ethanol.

16. The method of claim 12, wherein in step (d) at least at least 3 silicone hydrogel contact lenses are immersed in the $C_1$-$C_4$ alcohol solution of the positively-charged dye.

17. The method of claim 12, wherein the thickness criteria of a carboxyl-containing coating is one value selected from about 0.1 to about 20 micrometers, whereas the surface concentration criteria of carboxyl groups on a coated contact lens is about 200 nano-moles per lens.

* * * * *